US009325439B2

(12) United States Patent
Okabayashi

(10) Patent No.: US 9,325,439 B2
(45) Date of Patent: Apr. 26, 2016

(54) AUDIO SIGNAL PROCESSING DEVICE

(75) Inventor: Masaaki Okabayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 833 days.

(21) Appl. No.: 13/186,420

(22) Filed: Jul. 19, 2011

(65) Prior Publication Data

US 2012/0020497 A1 Jan. 26, 2012

(30) Foreign Application Priority Data

Jul. 20, 2010 (JP) ................................ 2010-162932

(51) Int. Cl.
*G06F 17/00* (2006.01)
*H04H 60/04* (2008.01)

(52) U.S. Cl.
CPC .................................... *H04H 60/04* (2013.01)

(58) Field of Classification Search
CPC .................................................... H04H 60/04
USPC ........................................... 700/94; 381/119
See application file for complete search history.

(56) References Cited

U.S. PATENT DOCUMENTS 5,402,501 A * 3/1995 Silfvajt et al. ................. 381/119
5,488,669 A * 1/1996 Zampini et al. ............... 381/119
5,636,283 A * 6/1997 Hill et al. ........................ 381/17
6,674,955 B2 * 1/2004 Matsui et al. ................. 386/281
2004/0030425 A1 * 2/2004 Yeakel et al. .................. 700/94
2006/0222189 A1 10/2006 Terada
2007/0229474 A1 10/2007 Okabayashi

FOREIGN PATENT DOCUMENTS

CN 1841494 A 10/2006
EP 1 715 606 A1 10/2006
EP 2 184 869 A1 5/2010
JP 2006-253982 A 9/2006

OTHER PUBLICATIONS

SSL 9000j console user manual: Copyright 1994.*
Yamaha DME 32 Manual copyright 2004.*
Yamaha Corp. (2004). Digital Production Console DM2000, Version 2 Owner's Manual, 403 pages.
Notification of Reason(s) for Refusal dated Dec. 10, 2013, for JP Application No. 2010-162932, with English translation, four pages.
European Search Report mailed Nov. 30, 2011, for EP Application No. 11174604.6, eight pages.

* cited by examiner

*Primary Examiner* — Paul McCord
(74) *Attorney, Agent, or Firm* — Morrison & Foerster LLP

(57) ABSTRACT

An output channel processing an audio signal after mixing in a mixing bus in a digital mixer is configured such that output points PreHPF and PostON are provided at locations before and after a signal processing module group composed of signal processing modules from a high-pass filter to an ON/OFF control module, an output selecting switch selects one of the output points to supply the audio signal at the selected output point to a direct-out output module which is provided corresponding to the output channel and includes an ON/OFF control module and a level adjustment module so that the audio signal can be outputted via the direct-out output module.

6 Claims, 8 Drawing Sheets

AUDIO SIGNAL PROCESSING DEVICE

BACKGROUND OF THE INVENTION

1. Field of the Invention

The present invention relates to an audio signal processing device which mixes audio signals inputted from a plurality of input channels in a mixing bus and outputs an audio signal after the mixing via an output channel corresponding to the mixing bus.

2. Description of the Related Art

An audio signal processing device with a mixing function such as a digital mixer or the like has been known conventionally. For example, a digital mixer with a mixing function having a signal processing configuration as illustrated in FIG. 9 is disclosed in the following Document 1. Further, the configurations of an input channel and an output channel of the configuration illustrated in FIG. 9 are described in more detail in FIG. 10.

Document 1: "DIGITAL PRODUCTION CONSOLE DM2000 Version 2 Owner's manual", Yamaha Corporation, 2004

More specifically, the digital mixer described in Document 1 includes an input patch 201, input channels 202, mixing buses 203, direct-outs 204, output channels 205, matrix buses 206, and an output patch 207 in a DSP (digital signal processor) being a processor performing audio signal processing.

Among them, the input patch 201 patches one of input ports prepared to correspond to not-illustrated input terminals for inputting audio signals to each of a plurality of input channels 202 respectively, and supplies each of the input channels with an audio signal which is inputted to the input port patched thereto.

Further, each of the input channels 202 includes, as illustrated in FIG. 10, a phase inversion module 211, a noise gate 212, an equalizer 213, a compressor 214, a delay 215, an ON/OFF control module 216 and a level adjustment module 217.

The signal processing modules from the phase inversion module 211 to the level adjustment module 217 perform various kinds of signal processing for adjusting the characteristics of signal such as the amplitude, frequency and the like on the audio signal supplied from the input port. Then, the audio signal after the signal processing is outputted to arbitrary one or more buses of the plurality of buses constituting the mixing buses 203.

Then, audio signals are similarly inputted from a plurality of input channels 202 to the mixing buses 203, and the audio signals inputted from the plurality of input channels 202 are mixed in each bus of the mixing buses 203 and outputted to the output channel 205 corresponding thereto.

This output channel 205 includes, as illustrated in FIG. 10, an attenuator 221, a parametric equalizer 222, a compressor 223, an ON/OFF control module 224, a level adjustment module 225, a delay 226, and a graphic equalizer 227.

The signal processing modules from the attenuator 221 to the graphic equalizer 227 perform various kinds of signal processing for adjusting the characteristics of signal such as the amplitude, frequency and the like on the audio signal produced by mixing in the mixing bus 203.

Further, the output patch 207 patches each of the output channels 205 to one of output ports prepared to correspond to not-illustrated output terminals, and outputs the audio signals after the signal processing in the output channels 205 to the patched output ports.

Due to the above configuration, the digital mixer can mix audio signals inputted from a plurality of input channels 202 in a mixing buses 203 and output audio signals after the mixing via output channels 205 respectively corresponding to the mixing buses 203.

Incidentally, in such a digital mixer, the output channels 205 are used for outputting audio signals for so-called FOH (front of house) of outputting sound from, for example, speakers provided at a stage, in a hall or the like. In this case, the output channels 205 will perform signal processing for adjusting characteristics of the audio signals after the mixing to those suitable for the use of FOH. Further, also during a live of musical performance or the like, processing parameters are edited as needed to finely adjust the state of the signal processing in some cases.

On the other hand, when recording input signals, it is unfavorable to use such audio signals adjusted for FOH. Further, it is also unfavorable that the audio signals for recording are affected during recording by the fine adjustment for FOH. For this reason, there was a need to output the signals processed in the input channels without undergoing the signal processing in the output channels, for output to a recording device and the like.

As a function for the need, a so-called direct-out function of selecting one of output points A to C illustrated in FIG. 10 by a direct-out signal selecting switch 218 and outputting the audio signal at the selected output point in the input channel 202 to the output patch 207 via the direct-out 204 is provided for each input channel in the digital mixer described in Document 1.

In addition to that, a so-called matrix mixer function of selecting one of output points D and E illustrated in FIG. 10 by an output point selecting switch 228 to input the audio signal at the selected output point in the output channel 205 into the matrix buses 206 for mixing is also provided for each output channel. Then, audio signals produced by mixing in the matrix buses 206 are outputted to the output patch 207.

Then, the aforementioned audio signals outputted from the direct-out 204 and the matrix buses 206 to the output patch 207 can also be respectively patched to output ports prepared to correspond to not-illustrated waveform output terminals, similarly to the audio signals outputted from the output channels 205, and outputted from output terminals corresponding to the ports.

SUMMARY OF THE INVENTION

However, in the case of using the above-described direct-out function, one direct-out 204 will be provided for each input channel. Therefore, when the number of input channels is increased, many signal transmission paths are required and the number of signals to be handled by the output patch 207 is also increased, causing a problem of complicated signal processing configuration. Further, also on the side receiving the outputted audio signals, there is a need not to separately receive the signals from the input channels but to collectively receive the signals from some of the input channels, but such a need could not be met.

An object of the invention is to solve such problems and make it possible to output audio signals processed in input channels collectively for a plurality of channels without being affected by unnecessary signal processing in output channels with less complication of signal processing configuration for mixing in an audio signal processing device.

In order to achieve the above-described object, an embodiment of the audio signal processing device of the invention is An audio signal processing device that mixes audio signals inputted from a plurality of input channels in a mixing bus and outputs an audio signal produced by the mixing after processing the audio signal, in the output channel corresponding to the mixing bus, by a signal processing module group including a plurality of first signal processing modules, comprising: output points respectively provided before the signal processing module group and after the signal processing module group on a signal processing path in the output channel; a selector for selecting one of the output points; a supplier for supplying the audio signal at the output point selected by the selector, in the output channel, to a second signal processing module corresponding to the output channel and provided outside the output channel; and an output device for outputting the audio signal processed by the second signal processing module.

Another embodiment is an audio signal processing device that mixes audio signals processed in a plurality of input channels in each of a plurality of mixing buses and processes audio signals produced by the mixing, in each of a plurality of output channels corresponding to each of the plurality of mixing buses, by a signal processing module group including a plurality of first signal processing modules, including: output points respectively provided before the signal processing module group and after the signal processing module group on a signal processing path in each of the plurality of output channels; a first selector and a second selector for selecting one of the output points independently of each other, provided for each of the plurality of the output channel; a first supplier for supplying the audio signal at the output point selected by the first selector, in each of the plurality of the output channels, to a second signal processing module corresponding to the output channel and provided outside the output channel; an output device for outputting the audio signal processed by the second signal processing module; a plurality of second mixing buses respectively mixes audio signals supplied thereto and output audio signals produced by the mixing; a second supplier for supplying the audio signal at the output point selected by the second selector, in each of the plurality of the output channels, to arbitrary one or more of the plurality of the second mixing buses; and a controller for controlling the second selectors and the second supplier such that the second selectors in one or more output channels designated by a user respectively select the output point after the signal processing module group, and the second supplier does not supply a second mixing bus, among the plurality of second mixing buses, to which the audio signal is supplied from any of the designated one or more output channels, with the audio signals from the output channels other than the any output channel.

In the above digital mixers, it is conceivable that the second signal processing module includes one or more signal processing modules each of which is the same as some of the plurality of the first signal processing modules included in the signal processing module group of the corresponding output channel, and the signal processing module included in the second signal processing module processes the audio signal using a value of a parameter which is same as a value the corresponding first signal processing module uses.

It is also conceivable that the second signal processing module includes a plurality of signal processing modules each of which is the same as some of the plurality of the first signal processing module included in the signal processing module group of the corresponding output channel, and the second signal processing module includes, for each of the plurality of the signal processing modules included in second signal processing module, a switch for switching whether or not signal processing by the signal processing module is performed on the audio signal supplied to the second signal processing module.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, embodiments for carrying out the invention will be concretely described based on the drawings.

First Embodiment FIG. 1 to FIG. 4

First, a digital mixer that is a first embodiment of the audio signal processing device of the invention will be described.

Figure 1:
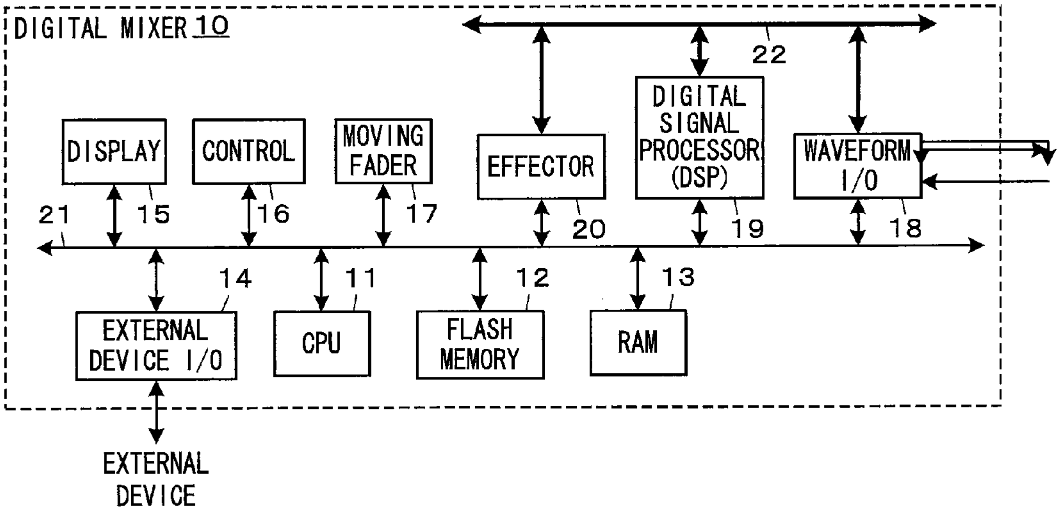
FIG. 1 is a diagram illustrating a schematic hardware configuration of a digital mixer being a first embodiment of an audio signal processing device of the invention.

A schematic hardware configuration of the digital mixer is illustrated in FIG. 1.

As illustrated in FIG. 1, a digital mixer 10 includes a CPU 11, a flash memory 12, a RAM 13, an external device input/output module (I/O) 14, a display 15, a control 16, a moving fader 17, a waveform I/O 18, a DSP 19, and an effector 20 which are connected to one another via a system bus 21. The waveform I/O 18, the DSP 19, and the effector 20 are also connected to one another via an audio bus 22 for transmitting audio data being digital audio signals.

Among them, the CPU 11, which is a controller centrally controls the operation of the digital mixer 10, executes a predetermined program stored in the flash memory 12 to thereby perform processing such as controlling input/output of audio signals in the waveform I/O 18 and display on the display 15, detecting operations to the control 16 and the moving fader 17 and editing values of various processing parameters in the digital mixer 10 according to the detected operations, and controlling signal processing in the DSP 19 and the effector 20.

The flash memory 12 is a rewritable nonvolatile memory storing a control program and so on executed by the CPU 11, and the RAM 13 is a volatile memory which stores data to be temporarily stored and is used as a work memory of the CPU 11.

The external device I/O 14 is an interface to which various kinds of external devices are connected to enable input/output from/to the external devices and, as the external device I/O 14, an interface for the connection to external display, mouse, keyboard for character input, and control panel and so on is prepared.

The display 15 is a display device displaying various kinds of information according to the control by the CPU 11, and can be composed of, for example, a liquid crystal display (LCD) panel or a light-emitting diode (LED).

The control 16, which is a device for accepting an operation to the digital mixer 10, can be composed of various kinds of keys, buttons, rotary encoders, sliders and so on. A touch panel stacked on the LCD being the display 15 can also be used.

The moving fader 17 is a slider control mainly for setting level parameters in input channels and output channels of the DSP 19, and includes a driver for moving knobs to arbitrary positions according to the control from the CPU 11.

The waveform I/O 18 is an interface for accepting input of audio signals which are to be processed in the DSP 19 and outputting audio signals after the processing. The waveform I/O 18 has an input/output board including a plurality of analog input terminals, a plurality of analog output terminals, a plurality of digital input/output terminals or so on, and inputs and outputs audio signals via those terminals.

The DSP 19 is composed of a digital signal processing circuit and executes a mixing function of applying signal processing such as mixing and equalizing to digital audio signals inputted from the waveform I/O 18 and outputting the audio signals after the signal processing again to the waveform I/O 18. The signal processing is controlled according to current values (current data) of various kinds of processing parameters. The current data can be edited by the user through operation of the above-described control 16, and the current data is stored in the RAM 13 or in a current memory included in the DSP 19 itself.

The effector 20 imparts various effects such as reverb, delay, chorus and so on to audio signals under processing in the DSP 19. When the effector 20 is used, an audio signal at a desired step of processing in the DSP 19 is taken out and supplied to the effector 20 where effects are imparted to the audio signal, and the audio signal after the effects have been imparted is then returned to the original step of the processing in the DSP 19.

Figure 2:
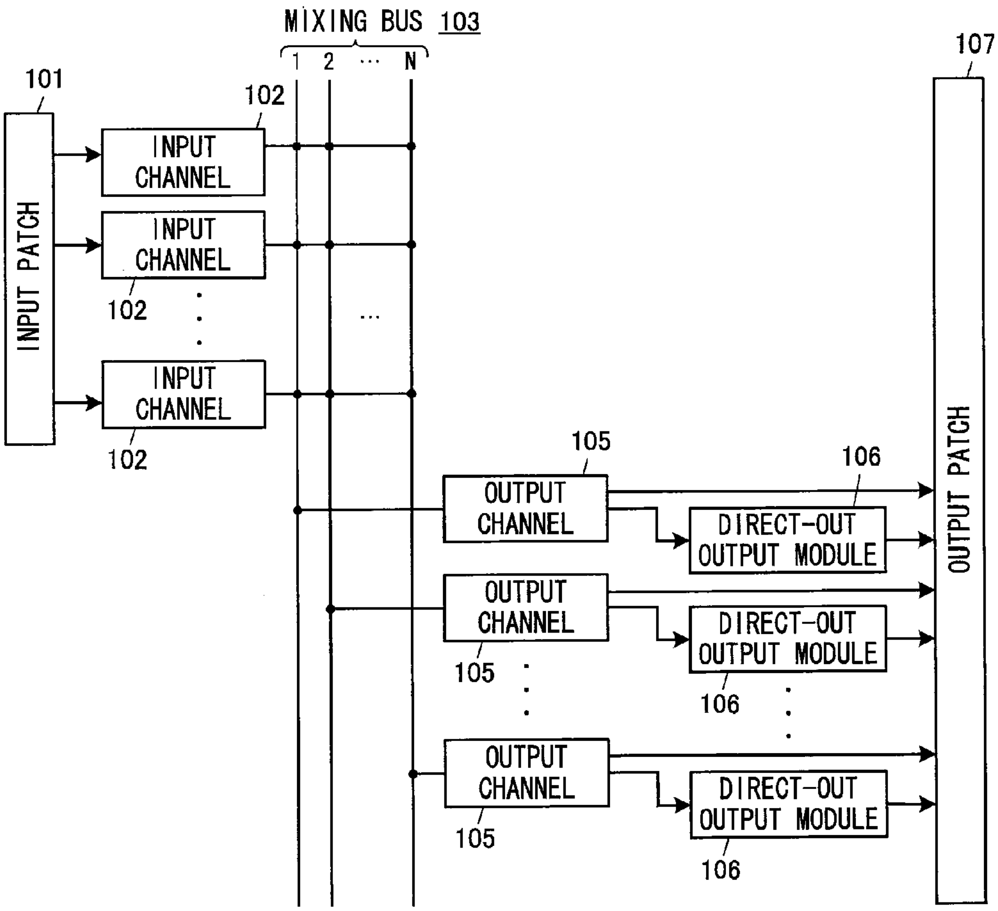
FIG. 2 is a diagram illustrating a schematic configuration of signal processing executed in a DSP illustrated in FIG. 1.
Figure 3:
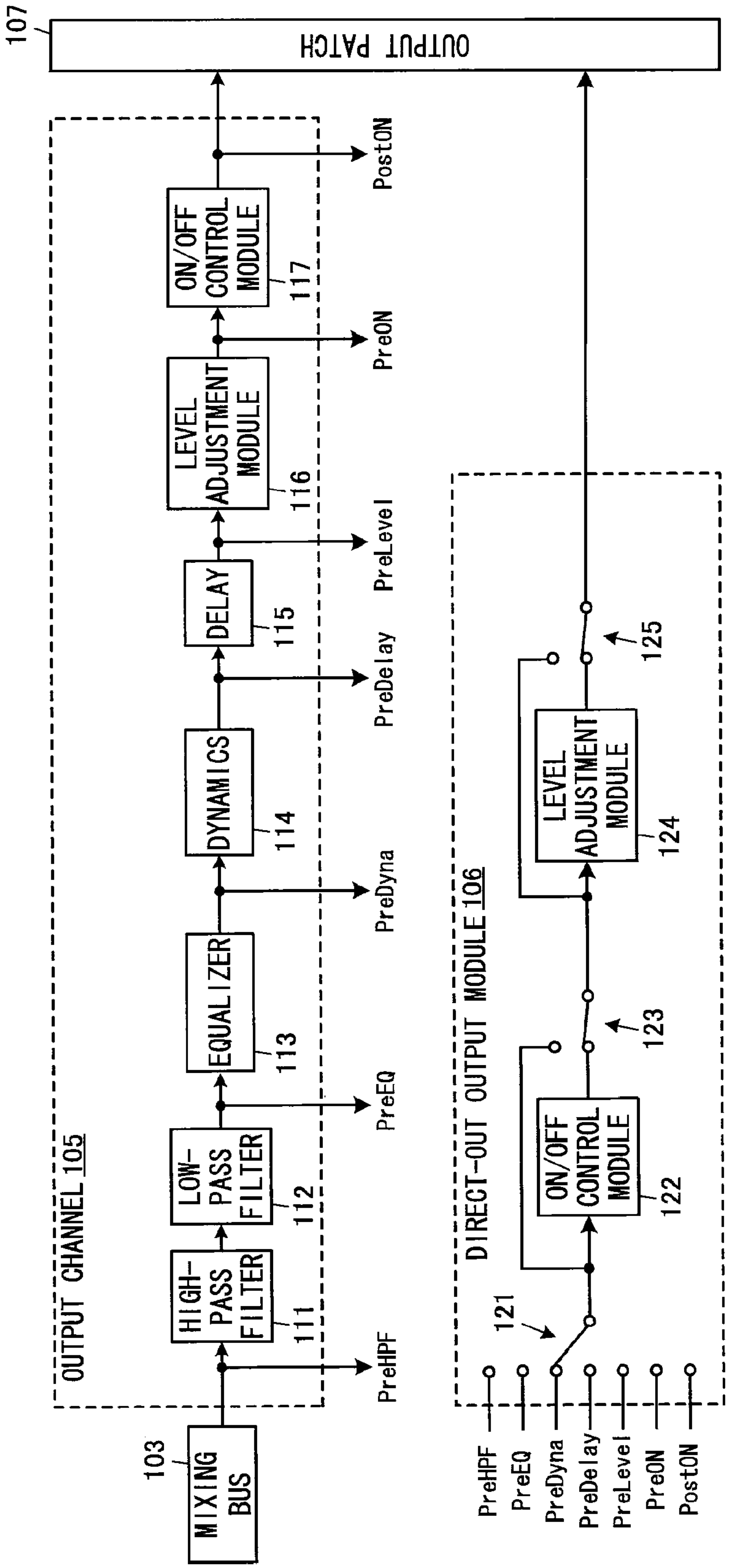
FIG. 3 is a diagram illustrating the configurations of an output channel and a direct-out output module illustrated in FIG. 2 in more detail.
Figure 9:
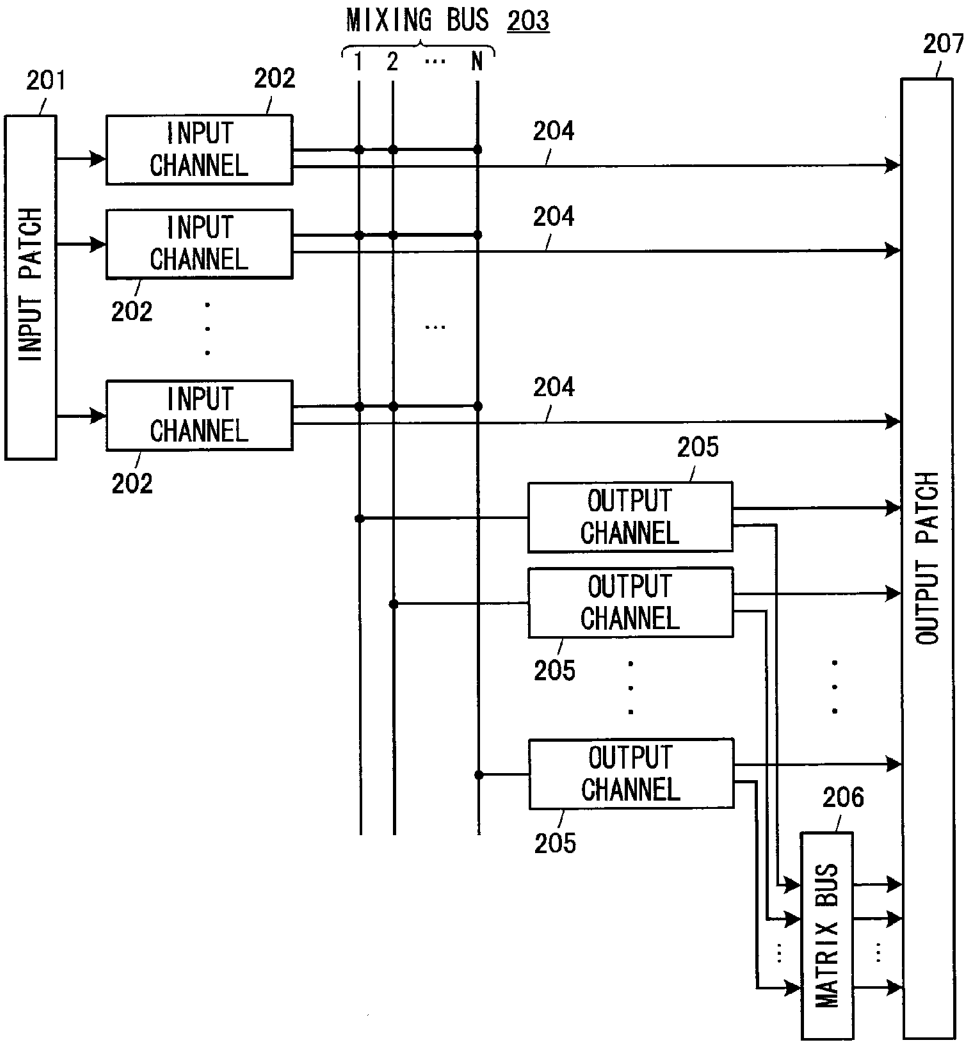
F I G. 9 PRIOR ART
FIG. 9 is a diagram illustrating an example of signal processing executed in a DSP included in a conventional digital mixer.

Next, the configuration of the signal processing executed in the DSP 19 illustrated in FIG. 1 is illustrated in FIG. 2, in a form similar to that of FIG. 9. Further, the configurations of the output channel and direct-out output module is illustrated in FIG. 3 in more detail. Note that functions relating to the signal processing may be implemented by running appropriate software on a processor, may be entirely implemented by hardware, or may be implemented by combination of them.

As illustrated in FIG. 2, the DSP 19 includes an input patch 101, input channels 102, mixing buses 103, output channels 105, direct-out output modules 106, and an output patch 107. The points of difference from the signal processing configuration in the conventional digital mixer illustrated in FIG. 9 are that the direct-outs extending from the input channels 102 are not provided, that transmission paths through which the signals are outputted from the output channels 105 to the output patch 107 via the direct-out output modules 106 are provided in place of the direct-outs from the input channels 102, and the configuration of the output channels 105. Hence, these points will be mainly described.

Figure 10:
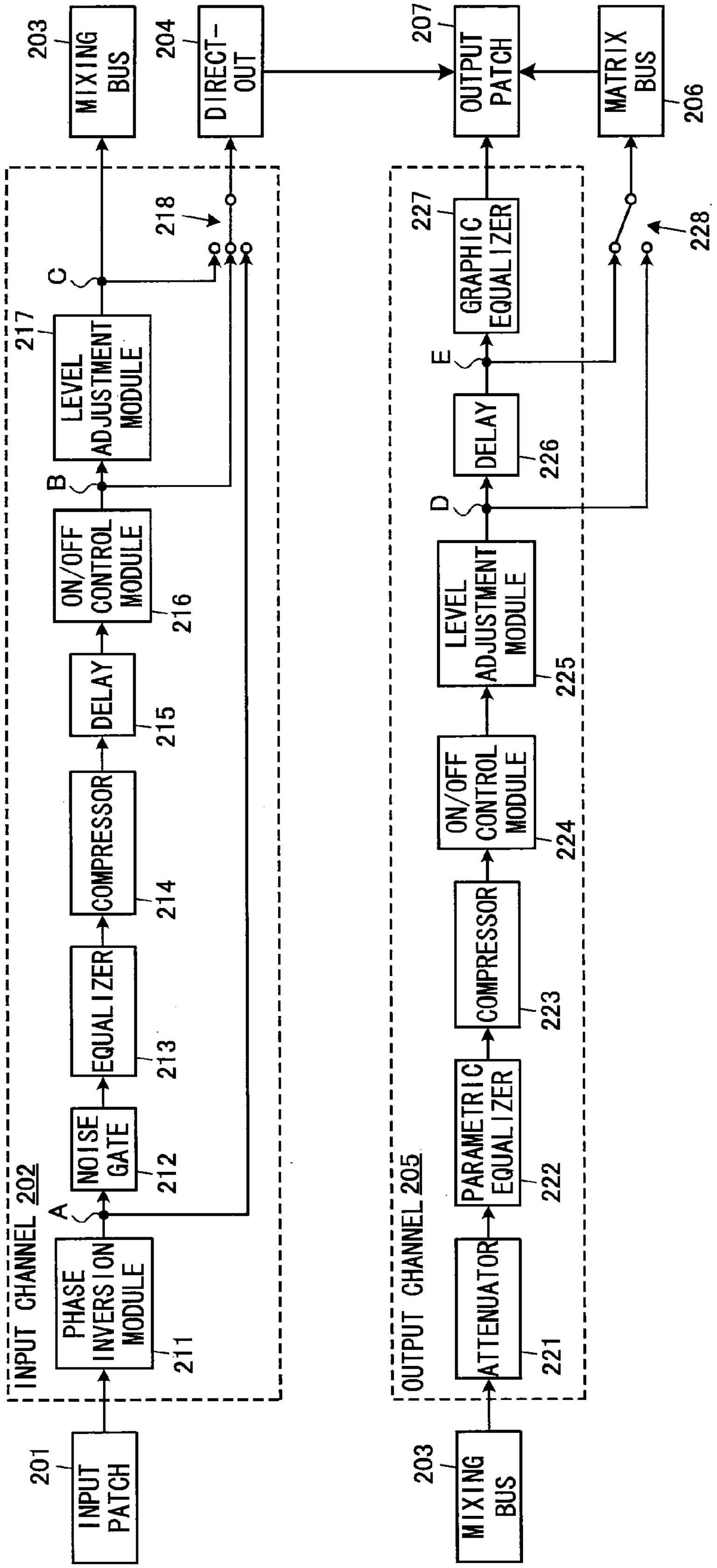
FIG. 10 PRIOR ART
FIG. 10 is a diagram illustrating the configurations of an input channel and an output channel illustrated in FIG. 9 in more detail.

Though detailed illustration is omitted, the configuration of the input channel 102 in the DSP 19 is a configuration where the output points A to C and the direct-out signal selecting switch 218 are omitted from the configuration of the input channel 202 illustrated in FIG. 10. The input channel 102 is the same as the input channel 202 illustrated in FIG. 9 and FIG. 10 in that the audio signal inputted from the input terminal of the waveform I/O 18 corresponding to the input port patched to the input channel by the input patch 101 is processed by each of the signal processing modules from the phase inversion module to the level adjustment module, and the audio signal after the signal processing is outputted to arbitrary one or more buses of the plurality of mixing buses 103.

On the other hand, the configuration of the output channel 105 is greatly different from the output channel 205 illustrated in FIG. 10.

In the output channel 105, a high-pass filter 111, a low-pass filter 112, an equalizer 113, a dynamics 114, a delay 115, a level adjustment module 116, and an ON/OFF control module 117 are provided as signal processing modules.

Note that the signal processing module refers to a block of software or hardware for performing signal processing relating to a function having some meaning. Incidentally, a signal processing module including a plurality of signal processing modules therein may be provided. For example, the high-pass filter 111 and the low-pass filter 112 are illustrated as separate signal processing modules in FIG. 3, and they can be recognized also as an integral signal processing module performing filtering processing for adjustment of frequency characteristics.

Aside from the above, a block of a plurality of signal processing modules can be regarded as one signal processing module group. For example, the signal processing modules from the high-pass filer 111 to the ON/OFF control module 117 can be collectively recognized also as one signal processing module group. In this case, the signal processing modules from the high-pass filer 111 to the ON/OFF control module 117 are a plurality of signal processing modules constituting one signal processing module group.

A plurality of output channels 105 are provided corresponding to the plurality of mixing buses 103, and each output channel performs various kinds of signal processing for adjusting the characteristics of signal such as the amplitude, frequency and the like on the audio signal produced by mixing in the corresponding mixing bus 103 by the signal processing modules from the high-pass filter 111 to the ON/OFF control module 117. Further, the audio signal after the processing is outputted via an output port patched to the output channel 105 by the output patch 107 from an output terminal corresponding to the output port in the waveform I/O 18.

Further, in the output channel 105, seven output points such as PreHPF, PreEQ, PreDyna, PreDelay, PreLevel, PreON, PostON are provided before or after the signal processing modules on the signal processing path as illustrated in FIG. 3. The audio signal at a position of them selected by an output selecting switch 121 that is a selector can be supplied to the direct-out output module 106 corresponding to the output channel 105.

Among the above-described seven output points, PreHPF is located before the first signal processing module in the output channel 105, and selection of this output point can supply the audio signal immediately after it is produced by mixing in the mixing bus 103 and before it is subjected to the signal processing in the output channel 105, to the direct-out output module 106.

Conversely, PostON is located behind the last signal processing module in the output channel 105, and selection of this output point can supply the same audio signal as the audio signal for which all the signal processing in the output channel 105 has been completed and which is outputted to the output port via the output patch 107, to the direct-out output module 106.

When another output point is selected, the audio signal after it is subjected to a part of the signal processing in the output channel 105 can be supplied to the direct-out output module 106.

Note that the output selecting switch 121 can be switched independently for each channel.

Here, the direct-out output module 106 is a second signal processing module provided as a signal output path for outputting the audio signal produced by mixing in the mixing bus 103, aside from the output channel 105. The direct-out output module 106 can be used not only as a transmission path similar to the direct-out 204 illustrated in FIG. 9 depending on the set contents but also in other various uses. Further, the direct-out output module 106 is also patched to an output port by the output patch 107 similarly to the output channel 105 so that the audio signal outputted from the direct-out output module 106 can be outputted from an output terminal of the waveform I/O 18.

In the direct-out output module 106, an ON/OFF control module 122 and a level adjustment module 124 are provided as the signal processing modules in addition to the above-described output selecting switch 121, and a follow ON switch 123 and a follow level switch 125 that are switches for switching whether or not signal processing by the signal processing modules is performed on the audio signal to be inputted to the direct-out output module 106 are provided. Note that the follow ON switch 123 and the follow level switch 125 can be switched independently for each direct-out output module 106.

Further, the ON/OFF control module 122 and the level adjustment module 124 respectively execute the signal processing of the same algorithms as those of the ON/OFF control module 117 and the level adjustment module 116 in the corresponding output channel 105 using the values of the same parameters (parameters in the same items stored in the current memory) as the parameters used by the ON/OFF control module 117 and the level adjustment module 116. Accordingly, the ON/OFF control module 122 and the level adjustment module 124 will execute the completely same signal processing as those by the ON/OFF control module 117 and the level adjustment module 116 on the audio signal supplied to the direct-out output module 106.

Therefore, for example, the audio signal that is taken out at the output point PreON and supplied to the direct-out output module 106 whose follow ON switch 123 is turned on and whose follow level switch 125 is turned off, subjected to the signal processing by the ON/OFF control module 122, and then outputted to the output patch 107, is completely the same as the audio signal outputted from the output channel 105 to the output patch 107 (if a slight timing difference associated with the difference of the signal transmission path is corrected).

By selecting the output point PreHPF by the output selecting switch 121 and turning off both of the follow ON switch 123 and the follow level switch 125 in the output channel 105 and the direct-out output module 106 having the above configurations, the audio signal produced by mixing in the mixing bus 103 can be outputted via the direct-out output module 106 without being affected by the signal processing in the output channel 105.

Further, by supplying an audio signal to an n-th mixing bus 103 from only one input channel 102, the same function as that of the direct-out 204 illustrated in FIG. 9 can be implemented in that the audio signal after the processing by the one input channel 102 can be outputted as it is as a direct-out output from the direct-out output module 106 corresponding to an n-th output channel 105.

Further, when it is desired to output a signal produced by mixing signals from a plurality of input channels 102, by supplying audio signals from a plurality of input channels 102 to the n-th mixing bus 103, a signal produced by gathering the signals from the plurality of input channels 102 can also be outputted from the direct-out output module 106 corresponding to the n-th output channel 105.

Generally, since the number of the output channels is smaller than the number of the input channels, providing the transmission paths for direct-outs corresponding not to the input channels but to the output channels as described above makes it possible to avoid an unnecessary increase in the number of signal transmission paths and output audio signals which are not affected by unnecessary signal processing in the output channels with less complication of the signal processing configuration. Further, it becomes possible to perform various outputs including output of the signal produced by gathering the signals from the plurality of input channels 102.

Further, in the configuration illustrated in FIG. 2 and FIG. 3, the same signal processing as that in the output channel 105 can be performed also in the direct-out output module 106 by the ON/OFF control module 122 and the level adjustment module 124 according to the user's intention. Accordingly, it is possible to respond to the demand to reflect a part of the signal processing performed in the output channel 105 also on the direct-out output.

It is possible to implement the effect of reflecting a part of the signal processing performed in the output channel 105 on the direct-out output even by selecting the output point provided in the middle of the output channel 105 like PreEQ and PreDyna by the output selecting switch 121.

Note that these audio signals can be recognized also as signals bypassing a part of the signal processing in the output channel 105. In the conventional configuration as illustrated in FIG. 9 and FIG. 10, it is necessary to provide an output channel for bypass in addition to the general output channel 205 in order to obtain such audio signals. However, in the configuration illustrated in FIG. 2 and FIG. 3, it is possible for the transmission path for direct-out to serve also as the output channel for the bypass, so that various functions can be provided with less complication of the signal processing configuration also in this point.

However, when the audio signal is taken out at the output point PreON or PostON lying downstream of the level adjustment module 116 in the output channel 105, if the processing in the level adjustment module 124 is performed in the direct-out output module 106, double processing will be performed. Hence, in such a case, it is preferable to automatically set the follow level switch 125 to OFF according to the selection of the output selecting switch 121. This also applies to the follow ON switch 123 when the output point PostON lying downstream of the ON/OFF control module 117 is selected.

Figure 4:
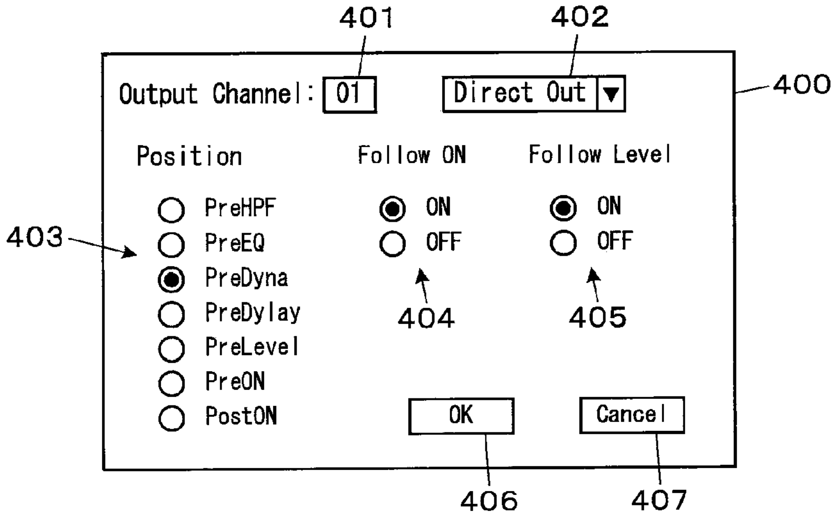
FIG. 4 is a diagram illustrating an example of a screen for accepting a setting operation relating to a direct-out output module.

Note that switching operations of the above-described output selecting switch 121, follow ON switch 123 and follow level switch 125 can be accepted through a screen as illustrated in FIG. 4.

An output channel setting screen 400 illustrated in FIG. 4 is a GUI (graphical user interface) displayed on the display 15 of the digital mixer 10 and includes a channel number setting part 401, a setting item selection part 402, a takeout position setting part 403, a follow ON setting part 404, a follow level setting part 405, an OK button 406, and a cancel button 407.

Among them, the channel number setting part 401 is an area for setting the number of the output channel 105 for which setting will be made. The setting item selection part 402 is a pull-down menu for selecting a portion in the output channel 105 for which setting will be made. The appearance of the output channel setting screen 400 differs according to the item selected here. FIG. 4 illustrates an example of a state that setting relating to the corresponding direct-out output module 106 is to be accepted.

The takeout position setting part 403, the follow ON setting part 404, and the follow level setting part 405 are radio buttons for setting alternatives to be selected by the output selecting switch 121, the follow ON switch 123 and the follow level switch 125 respectively.

The OK button 406 and the cancel button 407 are buttons for instructing enter and cancel of the parameters set on the output channel setting screen 400 respectively.

Second Embodiment FIG. 5 to FIG. 8

Next, a digital mixer that is a second embodiment of the audio signal processing device of the invention will be described. Note that this digital mixer is the same in the schematic hardware configuration as that of the first embodiment described using FIG. 1, and therefore description thereof will be omitted. Further, for the configurations in common with or corresponding to those of the first embodiment, the same reference signs will be used.

Figure 5:
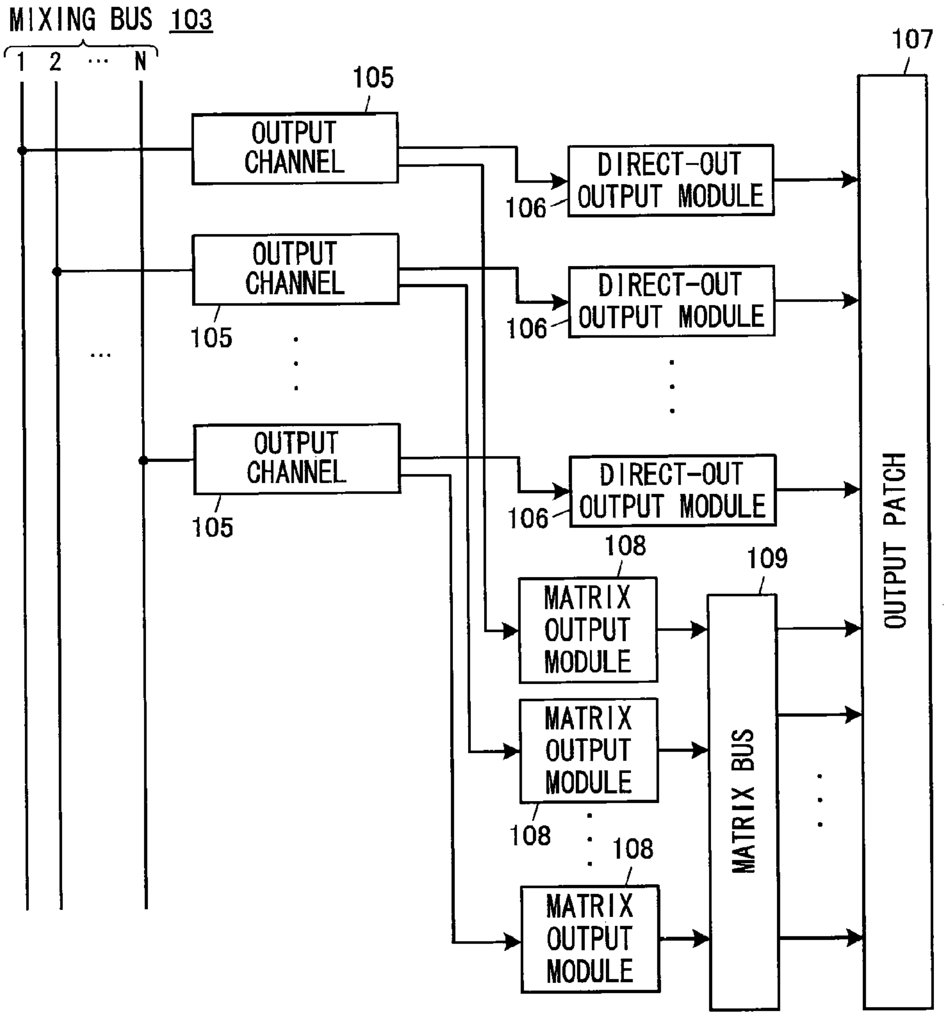
FIG. 5 is a diagram illustrating a schematic configuration of signal processing executed in a DSP of a digital mixer being a second embodiment of the invention.
Figure 6:
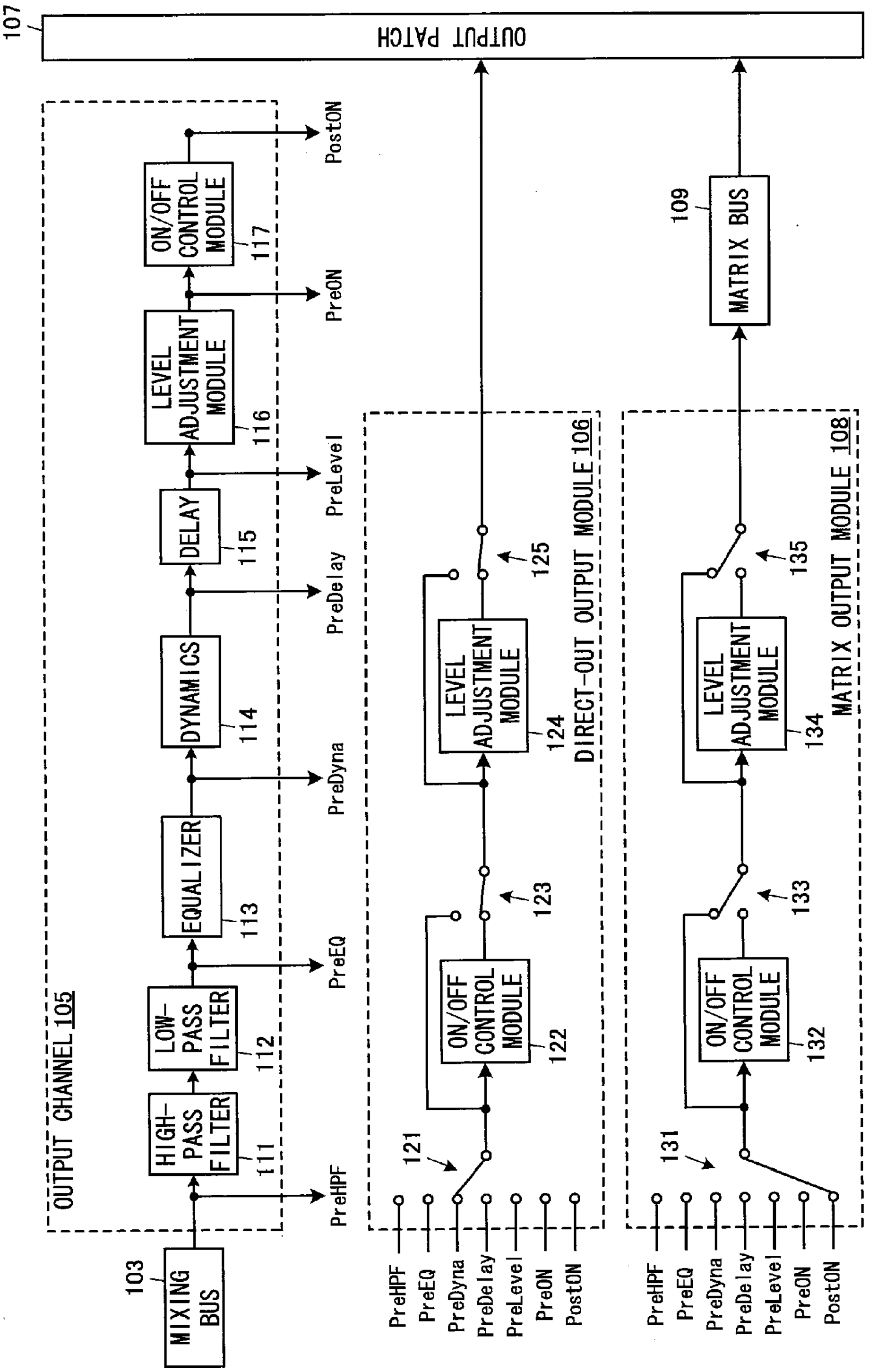
FIG. 6 is a diagram illustrating the configurations of an output channel, a direct-out output module and a matrix output module illustrated in FIG. 5 in more detail.

The configuration of the signal processing executed in the DSP 19 in the second embodiment is illustrated in FIG. 5 and FIG. 6, in forms similar to those in FIG. 2 and FIG. 3. Incidentally, in FIG. 5, an input patch 101 and input channels 102 are in common with those in the configuration of the first embodiment illustrated in FIG. 2, and therefore illustration thereof is omitted.

As is clear from FIG. 5, the second embodiment is different from the first embodiment in that the paths directly outputting the audio signals from output channels 105 to an output patch 107 are not provided, but paths transmitting the audio signals through matrix output modules 108 to a matrix bus 109 are provided instead so as to output the audio signals from the matrix bus 109 to the output patch 107. The configuration and function of direct-out output modules 106 are the same as those in the first embodiment.

Here, in the matrix output module 108, an output selecting switch 131, an ON/OFF control module 132, a follow ON switch 133, a level adjustment module 134, and a follow level switch 135 are provided as illustrated in FIG. 6. They have the same functions as those of the output selecting switch 121, the ON/OFF control module 122, the follow ON switch 123, the level adjustment module 124, and the follow level switch 125 in the direct-out output module 106. However, the selection by each of the switches can be set independently from those of the direct-out output module 106.

Further, the matrix bus 109 is a second mixing bus composed of a plurality of buses. The audio signal after processing by the matrix output module 108 corresponding to each of the output channels 105 can be supplied to arbitrary one or more buses of the plurality of buses composing the matrix bus 109, and the matrix bus 109 mixes, for each bus, all of the audio signals supplied to the bus.

The output patch 107 patches each of the plurality of buses composing the matrix bus 109 to an output port, so that the signal produced by mixing in each of the buses is supplied to the output port patched to the bus.

In the above configurations illustrated in FIG. 5 and FIG. 6, by selecting the output point PostON by the output selecting switch 131 and turning off both of the follow ON switch 133 and the follow level switch 135 in the matrix output module 108, the audio signal subjected to signal processing in the output channel 105 to the ON/OFF control module 117 that is the last signal processing module can be supplied as it is to the matrix bus 109.

By setting parameters for the matrix bus 109 such that the supplied audio signal is not mixed with the audio signal derived from other output channels 105, namely, only the audio signal derived from one output channel 105 is inputted into an n-th bus, the audio signal having the same characteristics as those of the audio signal directly outputted from the output channel 105 can be outputted to the output patch 107 through the path via the matrix output module 108 and the matrix bus 109.

When the direct-out is unnecessary, the audio signal having the same characteristics as those of the audio signal directly outputted from the output channel 105 can also be outputted to the output patch 107 by making similar setting in the direct-out output module 106.

Accordingly, similar output is available even if the path directly outputting the audio signal from the output channel 105 to the output patch 107 is not provided, so that such a path can be omitted in the digital mixer 10 of this embodiment to simplify the signal processing configuration.

The matrix bus itself is a conventionally known function as illustrated in FIG. 9. However, conventionally there is no idea of using the transmission path via the matrix bus in place of direct output from the output channel to the output patch. Accordingly, a path through which the audio signal for which signal processing by the last signal processing module (the graphic equalizer 227 in FIG. 10) in the output channel 205 has been completed is supplied to the matrix bus 206 is not prepared as recognized from FIG. 10.

The digital mixer 10 of this embodiment is characterized in that it is configured to enable to supply the signal at the output point PostON to the matrix bus 109 to thereby use the output via the matrix bus 109 as a substitute for the direct output from the output channel 105 to the output patch 107.

Note that when the number of lines of the matrix bus 109 is smaller than the number of channels of the output channels 105, all of the signals of the output channels 105 cannot be outputted only by the matrix bus 109. However, in the digital mixer 10 of this embodiment, the output via the direct-out output modules 106 can also be used as a substitute for the direct output from the output channels 105 to the output patch 107 for the output channel for which direct-out output is unnecessary by making an arbitrary setting as described above.

Accordingly, it is believed that preparation of some lines of the matrix bus 109 causes, only at a negligible degree, a situation that the audio signal after the processing in the output channel 105 cannot be outputted.

Figure 7:
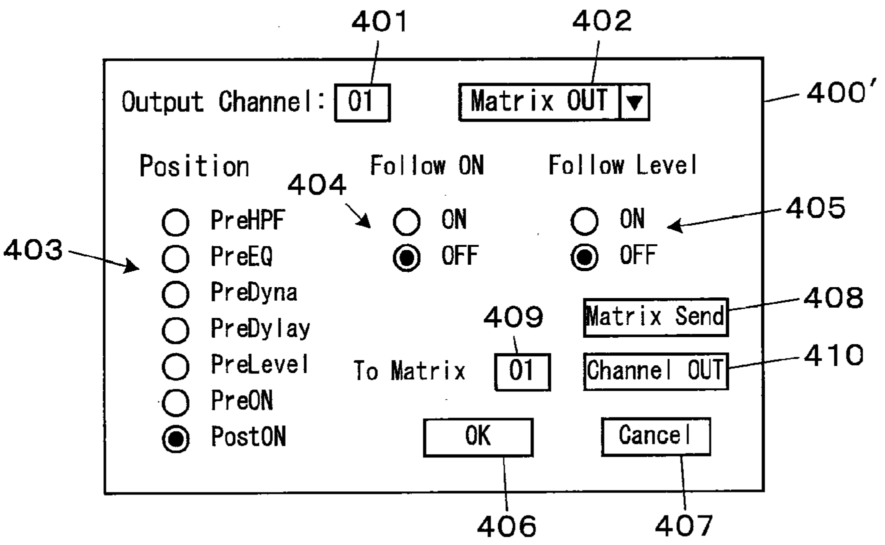
FIG. 7 is a diagram illustrating an example of a screen for accepting a setting operation relating to the matrix output module.

Here, an example of the screen for accepting the operation relating to the matrix output module 108 is illustrated in FIG. 7.

An output channel setting screen 400' illustrated in FIG. 7 includes a matrix send button 408, a bus selecting part 409 and a channel output setting button 410 in addition to the parts included in the output channel setting screen 400 illustrated in FIG. 4.

The output channel setting screen 400' is displayed when the setting relating to the matrix output module 108 is selected at the setting item selection part 402.

Then, the user can set the alternatives to be selected by the output selecting switch 131, the follow ON switch 133 and the follow level switch 135, at the takeout position setting part 403, the follow ON setting part 404, and the follow level setting part 405, respectively, similar to those illustrated in FIG. 4.

Further, when the matrix send button 408 is pressed down, the output channel setting screen 400' proceeds to a not-illustrated transmission destination setting screen for setting a bus among the plurality of buses composing the matrix bus 109 to which the audio signal is supplied from the matrix output modules 108.

The bus selecting part 409 and the channel output setting button 410 are areas for making setting to use the matrix bus 109 in place of direct output from the output channel 105 to the output patch 107. When the channel output setting button 410 is pressed down in the state that the bus of one line in the matrix bus 109 is selected at the bus selection part 409, the digital mixer 10 automatically makes setting for using the selected bus in place of direct output from the output channel set at the channel number setting part 401 to the output patch 107.

Figure 8:
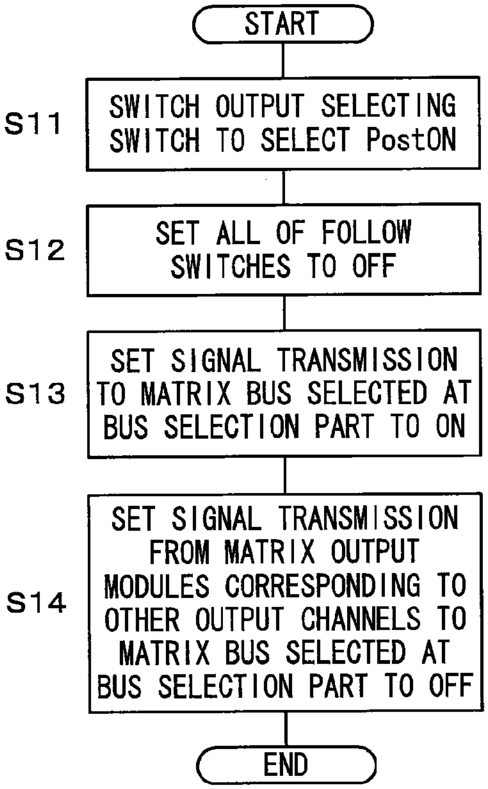
FIG. 8 is an illustration illustrating an example of processing executed by a CPU of the digital mixer according to the operation on the screen illustrated in FIG. 7.

FIG. 8 illustrates a flowchart of processing executed by the CPU 11 for the setting.

In the processing, the CPU 11 first switches the output selecting switch 131 to select PostON for the matrix output module 108 corresponding to the output channel set at the channel number setting part 401 (S11). Then, the CPU 11 sets all of the follow switches included in the matrix output module 108 (switches for selecting enabling or disabling of processing by a signal processing module, the follow ON switch 133 and the follow level switch 135 here) to OFF (S12), and sets signal transmission to the bus selected at the bus selection part 409 of the matrix bus 109 to ON (S13). Further, the CPU 11 sets the signal transmission from the matrix output modules 108 corresponding to the other output channels 105 to the bus selected at the bus selection part 409 to OFF (S14), and the processing ends.

Through the above processing, the setting for outputting the audio signal having the same characteristics as those of the audio signal after being processed in the output channel 105 and then directly outputted from the output channel 105 to the output patch 107, through the path via the matrix output module 108 and the matrix bus 109, can be automatically made according to the button operation by the user.

Note that the direct-out output module 106 may be similarly configured such that the CPU automatically executes the processing at the steps S11 and S12 according to the button operation by the user to perform settings to utilize the audio signal outputted through the direct output module 106 as a substitute of the audio signal directly outputted from the output channel 105.

Modifications

The description of the embodiments ends here, but it is of course that the configuration of the apparatus, the signal processing configuration, the appearance of the screen, the concrete processing and so on are not limited to those described in the above-describe embodiments.

For example, the kinds, the numbers or the arrangements of the signal processing modules provided in the input channels and the output channels are not limited to those illustrated in FIG. 3 and FIG. 10. The number and positions of the output points provided in the output channels are not limited to those illustrated in FIG. 3. For example, the signal processing module may be the one for which the same parameters are referred over a plurality of output channels like a DCA (digital control and amplifier) group.

Further, the kinds, the numbers or the arrangements of the signal processing modules provided in the direct-out output modules 106 and the matrix output modules 108 are not limited to those illustrated in FIG. 3 and FIG. 6. As a matter of course, it is conceivable to provide a level adjustment module utilizing the above-described DCA group and a follow DCA switch for switching enabling or disabling of the level adjustment by the level adjustment module.

Further, the kinds, the numbers or the arrangements of the provided signal processing modules may be different between the direct-out output module 106 and the matrix output module 108. Furthermore, it is also conceivable that no signal processing module is provided in one or both of the direct-out output modules 106 and the matrix output modules 108. Moreover, it is not even prohibited to provide, in one or both of the direct-out output modules 106 and the matrix output modules 108, an independent signal processing module performing processing different from that of the signal processing modules provided in the output channels 105, in addition to signal processing modules performing the same processing as those in the signal processing modules provided in the output channels 105.

Further, the invention is also applicable to an audio signal processing device other than the digital mixer. For example, the invention is also applicable to electronic musical instruments such as a synthesizer with a mixer function and so on, a mixer engine mainly operated from an external PC (Personal Computer), a PC with a mixer function implemented by a DAW (digital audio workstation) application.

Further, the modifications described above as well as the configurations described in the embodiments are applicable in any combination in a range without contradiction.

As apparent from the above description, according to the audio signal processing device of the invention, it is possible to output audio signals processed in input channels collectively for a plurality of channels without being affected by unnecessary signal processing in output channels with less complication of signal processing configuration for mixing.

Accordingly, application of the invention enables improvement in convenience of the audio signal processing device.

What is claimed is:

1. An audio signal processing device comprising:

a plurality of input channels for inputting audio signals;

a mixing bus for mixing the inputted audio signals into a mixed audio signal;

an output channel for receiving the mixed audio signal onto a first signal path as an output channel audio signal, the output channel comprising:

a first level adjustment module for performing signal processing on audio signals on the first signal path and a first ON/OFF control module for performing signal processing on audio signals on the first signal path, wherein each of a plurality of output points is respectively provided before or after a signal processing module on the first signal path in the output channel;

a direct output module for receiving the output channel audio signal onto a second signal path as a direct output module audio signal, the direct output module comprising:

a selector for selecting one of the plurality of output points, wherein the output channel audio signal is supplied as the direct output module audio signal to the second signal path at the selected output point, a second level adjustment module for performing signal processing on audio signals on the second signal path, wherein the signal processing of the second level adjustment module is the same as the signal processing of the first level adjustment module, a second ON/OFF control module for performing signal processing on audio signals on the second signal path, wherein the signal processing of the second ON/OFF control module is the same as the signal processing of the first ON/OFF control module, and a switch, for the second level adjustment module, for switching whether or not signal processing of the second level adjustment module is performed on the direct output module audio signal, a switch, for the second ON/OFF control module, for switching whether or not signal processing of the second ON/OFF control module is performed on the direct output module audio signal; and an output device for outputting the direct output module audio signal from the direct output module.

2. The audio signal processing device according to claim 1, wherein the second ON/OFF control module is located before the second level adjustment module on the second signal path of the direct output module.

3. An audio signal processing device comprising:

a plurality of input channels for inputting audio signals;

a mixing bus for mixing the inputted audio signals into a mixed audio signal;

an output channel for receiving the mixed audio signal onto a first signal path as an output channel audio signal, the output channel for:

performing a first level adjustment signal processing on audio signals on the first signal path and performing a first ON/OFF control signal processing on audio signals on the first signal path, wherein each of a plurality of output points is respectively provided before or after a signal processing is performed on the first signal path in the output channel;

a direct output channel for receiving the output channel audio signal onto a second signal path as a direct output channel audio signal, the direct output channel for:

selecting one of the plurality of output points, wherein the output channel audio signal is supplied as the direct output channel audio signal to the second signal path at the selected output point, performing a second level adjustment signal processing on audio signals on the second signal path, wherein the second level adjustment signal processing is the same as the first level adjustment signal processing, performing a second ON/OFF control signal processing on audio signals on the second signal path, wherein the second ON/OFF control signal processing is the same as the first ON/OFF control signal processing, switching whether or not the second level adjustment signal processing is performed on the direct output channel audio signal, and switching whether or not the second ON/OFF control signal processing is performed on the direct output channel audio signal; and an output patch for outputting the direct output channel audio signal from the direct output channel.

4. The audio signal processing device according to claim 3, wherein the second ON/OFF control signal processing is performed before the second level adjustment signal processing on the second signal path of the direct output channel.

5. An audio signal processing device comprising:

a plurality of input channels for inputting audio signals;

a mixing bus for mixing the inputted audio signals into a mixed audio signal;

an output channel for receiving the mixed audio signal onto a first signal path as an output channel audio signal, the output channel comprising:

a signal processing circuit configured for performing a first level adjustment signal processing on audio signals on the first signal path and a signal processing circuit configured for performing a first ON/OFF control signal processing on audio signals on the first signal path, wherein each of a plurality of output points is respectively provided before or after a signal processing circuit on the first signal path in the output channel;

a direct output channel for receiving the output channel audio signal onto a second signal path as a direct output channel audio signal, the direct output channel comprising:

a selector circuit for selecting one of the plurality of output points, wherein the output channel audio signal is supplied as the direct output channel audio signal to the second signal path at the selected output point, a signal processing circuit configured for performing a second level adjustment signal processing on audio signals on the second signal path, wherein the second level adjustment signal processing is the same as the first level adjustment signal processing, a signal processing circuit configured for performing a second ON/OFF control signal processing on audio signals on the second signal path, wherein the second ON/OFF control signal processing is the same as the first ON/OFF control signal processing, a switch circuit for switching whether or not the second level adjustment signal processing is performed on the direct output channel audio signal, and a switch circuit for switching whether or not the second ON/OFF control signal processing is performed on the direct output channel audio signal; and an output patch for outputting the direct output channel audio signal from the direct output channel.

6. The audio signal processing device according to claim 5, wherein the signal processing circuit configured for the second ON/OFF control signal processing is located before the signal processing circuit configured for the second level adjustment signal processing on the second signal path of the direct output channel.

* * * * *